March 24, 1964
J. LOSCHEN
3,126,109
DEFLECTOR ATTACHMENT FOR CONVEYER OF CORN PICKING MACHINES
Filed March 2, 1961
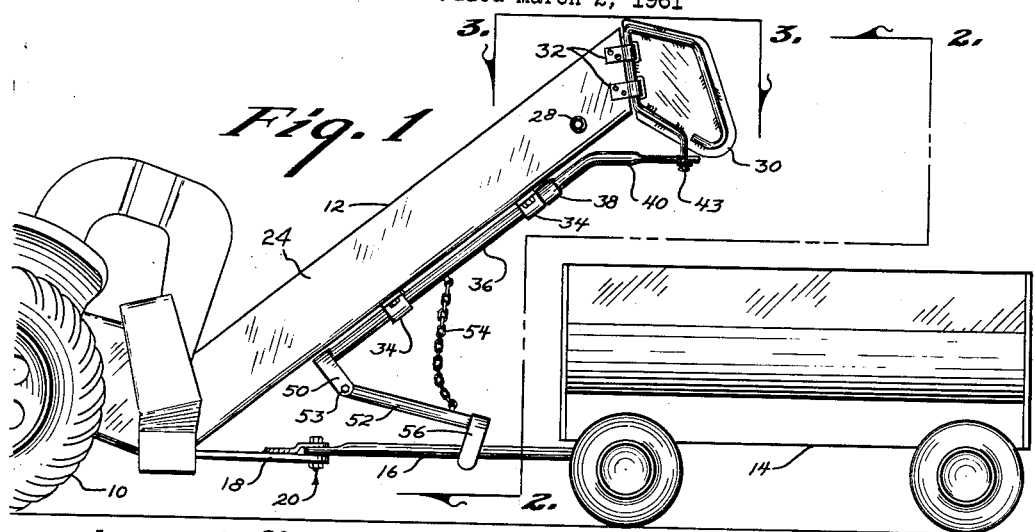
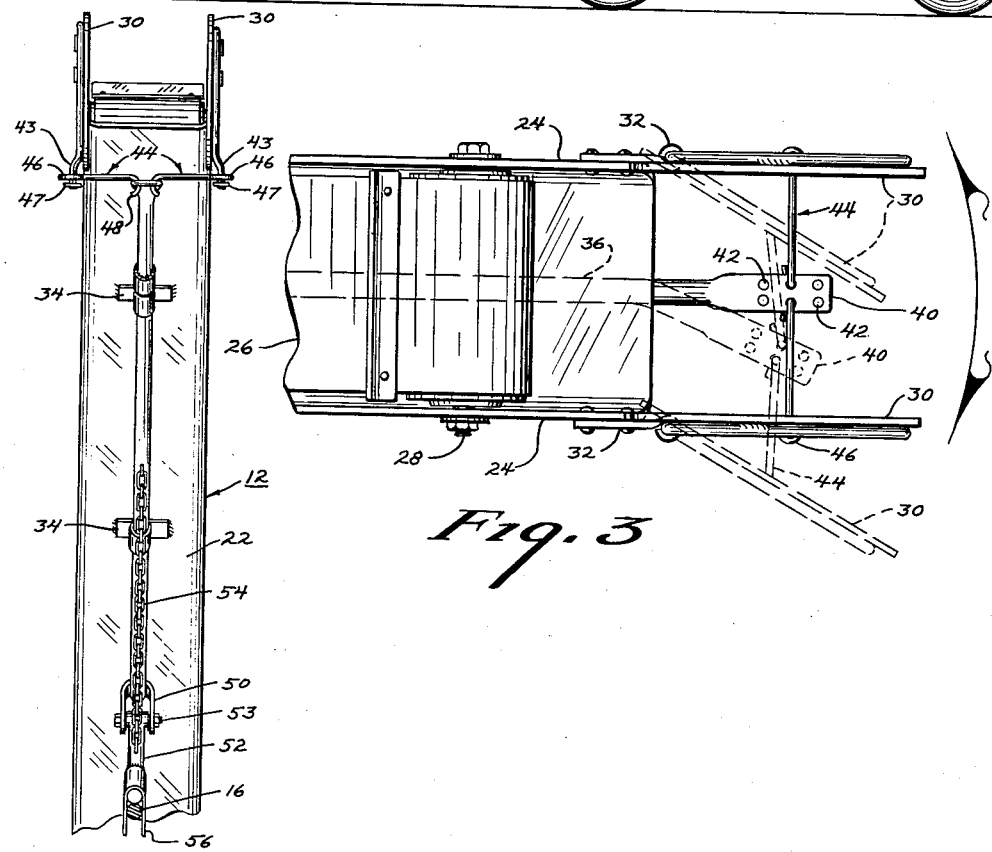
INVENTOR.
JOHN LOSCHEN
BY
Talbert Dick & Farley
ATTORNEYS

United States Patent Office 3,126,109
Patented Mar. 24, 1964

3,126,109
DEFLECTOR ATTACHMENT FOR CONVEYER OF CORN PICKING MACHINES
John Loschen, Van Meter, Iowa
Filed Mar. 2, 1961, Ser. No. 92,984
3 Claims. (Cl. 214—42)

My invention relates to corn picking machines and more particularly to a device to deflect ears of corn from the conveyer into a wagon.

Corn picking machines are customarily mounted on tractors and have a conveyer which extends rearwardly and upwardly from the tractor. A farm wagon is normally pulled by the tractor and is intended to follow the tractor at a point directly below the ear discharge point on the conveyer to contain the ears of corn as they fall from the conveyer. However, corn rows are customarily planted to extend horizontally around the hills rather than "up and down" the hills to prevent erosion of the soil (this system is normally called "contour farming") and as the tractor proceeds along these curved rows of corn, the farm wagon does not remain in alignment with the tractor and trails to the rear and off to one side. The result of this phenomenon is that the picked ears of corn sometimes fall from the conveyer onto the ground when the farm wagon is in this state of disalignment with the tractor.

Therefore, the principal object of my invention is to provide a deflector attachment for conveyers of corn picking machines that can sense the position of the wagon and which can deflect the ears of corn from the conveyer to the wagon.

A further object of my invention is to provide a deflector attachment for conveyers of corn picking machines that can be easily secured to existing conveyers.

A still further object of my invention is to provide a deflector attachment for conveyers of corn picking machines that will not interfere with the normal functions of the tractor, corn picking machine or farm wagon.

A still further object of my invention is to provide a deflector attachment for conveyers of corn picking machines that can be used with farm wagons having tongues of different diameter or size.

A still further object of my invention is to provide a deflector attachment for conveyers of corn picking machines that is economical of manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a side elevational view of my device as mounted on the conveyer of a corn picking machine and as used in conjunction with a farm wagon;

FIG. 2 is a partial elevational view of my device as viewed on line 2—2 of FIG. 1; and FIG. 3 is a partial plan view of a portion of my device as viewed on line 3—3 of FIG. 1.

I have used the numeral 10 to generally designate a portion of a farm tractor which has a corn picking machine conveyer 12 secured thereto in conventional fashion. As shown in FIG. 1, conveyer 12 extends upwardly and rearwardly from tractor 10. A farm wagon 14 with tongue 16 is pivotally secured in a horizontal plane to tractor drawbar 18 by means of clevis element 20.

Conveyer 12 is comprised of bottom 22, sides 24, and a continuous belt 26 which rotates over a suitable drum and shaft 28 at the upper end of the conveyer. The ears of corn normally are thrown rearwardly from the upper end of belt 26 and then fall into the box of wagon 14. The structure defined thus far is of conventional design and does not of itself comprise a part of my invention.

Downwardly and rearwardly extending deflectors 30 are hinged to the substantially vertical upper ends of the sides 24 of conveyer 12 as shown in FIG. 1. Deflectors 30 are secured to conveyer 12 by hinges 32 and pivot about a substantially vertical axis.

Hollow bearings 34 can be bolted, welded or otherwise secured to the bottom 22 of conveyer 12 as shown in FIG. 2. Bearings 34 are axially aligned and movably receive shaft 36 therein. Shoulder 38 is rigidly secured to shaft 36 and engages the uppermost bearing 34 to prevent the shaft from sliding downwardly through the bearings. Shaft 36 is then adapted to rotate about its own longitudinal axis within bearings 34. The upper end 40 of shaft 36 is bent to extend in a horizontal direction. As shown in FIG. 3, a plurality of pairs of holes 42 are located in the extreme upper end portion of shaft 36. Vertical stub shafts 43 are welded or otherwise secured to deflectors 30 and extend downwardly therefrom. Separate link elements 44 are pivotally secured by one of their ends to each of the two stub shafts 43. Eyelets 46 on link elements 44 effects this connection between the link elements and stub shafts 43 to afford some movement in a vertical direction with respect to the stub shafts as well as movement in a horizontal plane. Discs 47 on shafts 43 prevent the link elements from dropping off the shafts. Hooks 48 on the other ends of link elements 44 are adapted to detachably engage holes 42 in the upper end of shaft 36.

A clevis 50 is rigidly secured by welding or the like to the lower end of shaft 36 and normally extends downwardly and rearwardly from conveyer 12 in a vertical plane. As shown in FIG. 1, clevis 50 is substantially perpendicular to the longitudinal axis of shaft 36. Rod 52 is pivotally secured to clevis 50 by pin 53 and is adapted to pivot in a vertical plane. A chain 54 is secured in any convenient fashion by its respective ends to rod 52 and shaft 36 to limit the downward pivotal movement of the rod. Spaced apart ears 56 extend downwardly from the lower rearmost end of rod 52 and are adapted to receive tongue 16 therebetween as shown in FIG. 2.

The normal operation of my device is as follows: When wagon 14 is not secured to the tractor drawbar 18, chain 54 prevents ears 56 from engaging the ground surface. When the tongue 16 of wagon 14 is secured to the tractor drawbar 18, as shown in FIG. 1, the rod 52 can be pivoted upwardly about pin 53 and then lowered on the tongue so that ears 56 embrace the tongue. Rod 52 is shown in FIG. 1 as it is being lowered onto the tongue 16.

When the tractor is traveling in a straight path, the longitudinal axis of tongue 16 is parallel with the longitudinal axis of shaft 36 and conveyer 12. The deflectors 30 are then in the position of the solid lines in FIG. 3. However, as the tractor begins to move along the curved contoured rows of corn, the wagon 14 begins to trail to the rear and to one side of the tractor. This causes the wagon tongue 16 to pivot in a horizontal plane on drawbar 18. Rod 52 follows this displacement of tongue 16 by virtue of its lower end being detachably secured to the tongue by ears 56. The displacement of rod 52 also displaces clevis 50 in the same manner, and this movement of clevis 50 causes shaft 36 to rotate about its own longitudinal axis. This rotation of shaft 36 causes its upper end 40 to move in a substantially horizontal plane. By observing the dotted lines in FIG. 3, it is seen that when the upper end 40 of shaft 36 moves from its "neutral" position, it causes a corresponding displacement of deflectors 30 by virtue of the link elements 44 that connect end 40 and the deflectors. When the deflectors are in the position shown by the dotted lines in FIG. 3, the ears of corn departing from the "upper" half of the conveyer, as viewed in FIG. 3, will be deflected by the "uppermost" deflector 30 in a lateral and rearward direction away from the conveyer toward the position of the disaligned wagon. Thus, it is seen that the position of the tongue on the wagon will always determine the pivoted position of the deflectors 30, and that the ears of corn departing from the side of the conveyer opposite to the disaligned position of the wagon will always be deflected toward the wagon. The link elements 44 can be placed in different sets of holes 42 in the upper end 40 of shaft 36 to increase or decrease the pivoting action of deflectors 30.

Thus, from the foregoing, it is seen that my device will accomplish all of its stated objectives.

Some changes may be made in the construction and arrangement of my deflector attachment for conveyer of corn picking machines without departing from the real spirit and purpose of my invention, and it is my intention to cover by my claims, any modified forms of structure or use of mechanical equivalents which may be reasonably included within their scope.

I claim:

1. In a device of the class described, a conveyer, said conveyer adapted to be secured to a tractor or like and extend rearwardly and upwardly therefrom in an inclined position, said conveyer having two opposite side walls and a bottom wall; belt means on said conveyer for moving picked ears of corn upwardly and rearwardly between the walls of said conveyer for discharge from the upper end thereof in a rearwardly direction, the upper ends of said walls terminating in a vertical plane beyond the upper end of said belt, deflector elements pivotally secured to the upper vertical ends of each wall of said conveyer, said deflector elements normally extending rearwardly in parallel fashion from said conveyer, an elongated shaft secured to the bottom wall of said conveyer and being adapted to rotate about its longitudinal axis, a connecting rod having one end secured to the lower end of said shaft and adapted to pivot in the plane of said shaft the other end of said rod adapted to detachably engage the tongue of a wagon whereby movement of said rod in a horizontal plane will impart rotational movement to said shaft, and link means connecting the other end of said shaft and said deflector elements, to pivot said deflector elements when said shaft is rotated.

2. In a device of the class described, a conveyer, said conveyer adapted to be secured to a tractor or like in an inclined position, said conveyer having two opposite side walls, a bottom wall and a rearward upper end; belt means on said conveyer for moving picked ears of corn upwardly and rearwardly between the walls of said conveyer for discharge from the upper end thereof in a rearwardly direction, the upper ends of said walls terminating in a vertical plane beyond the upper end of said belt, deflector elements pivotally secured to the upper vertical ends of each wall of said conveyer, said deflector elements normally extending rearwardly in parallel fashion from said conveyer, an elongated shaft secured to the bottom wall of said conveyer and being adapted to rotate about its longitudinal axis, a connecting rod having one end pivotally secured to the lower end of said shaft, said rod being adapted to pivot relative to said shaft in the plane of said shaft, spaced apart ears extending downwardly from the other end of said rod to receive a wagon tongue therebetween, and a pair of link elements extending in opposite lateral directions from the upper end of said shaft and being secured at their free ends to the adjacent deflector elements to pivot said deflector elements when said shaft is rotated.

3. In a device of the class described, a conveyer, said conveyer adapted to be secured to a tractor or like and extend rearwardly and upwardly therefrom in an inclined position, said conveyer having two opposite side walls and a bottom wall; belt means on said conveyer for moving picked ears of corn upwardly and rearwardly between the walls of said conveyer for discharge from the upper end thereof in a rearwardly direction, the upper ends of said walls terminating in a vertical plane beyond the upper end of said belt, deflector elements pivotally secured to the upper vertical ends of each side wall of said conveyer, said deflector elements normally extending rearwardly in parallel fashion from said conveyer, an elongated shaft secured to the bottom wall of said conveyer and being adapted to rotate about its longitudinal axis, a connecting rod having one end secured to the lower end of said shaft and adapted to pivot in the plane of said shaft, the other end of said rod adapted to detachably engage the tongue of a wagon whereby movement of said rod in a horizontal plane will impart rotational movement to said shaft, the other end of said shaft extending rearwardly of said conveyer at an angle to the longitudinal axis of said shaft; and a pair of link elements, each of said link elements having one end movably secured to the other end of said shaft, said link elements extending in opposite transverse directions from said shaft, the free ends of said link elements being pivotally secured to their adjacent deflector element whereby said deflector elements are pivoted when said shaft is rotated.

References Cited in the file of this patent

UNITED STATES PATENTS

| | | |
|---|---|---|
| 1,306,462 | Bergerud | June 10, 1919 |
| 2,634,004 | Turek | Apr. 7, 1953 |
| 2,732,959 | De Penning | Jan. 31, 1956 |
| 2,789,705 | Eberly | Apr. 23, 1957 |
| 2,807,378 | Currie | Sept. 24, 1957 |